W. C. SHARP.
CURTAIN-FIXTURES.
No. 187,918. Patented Feb. 27, 1877.
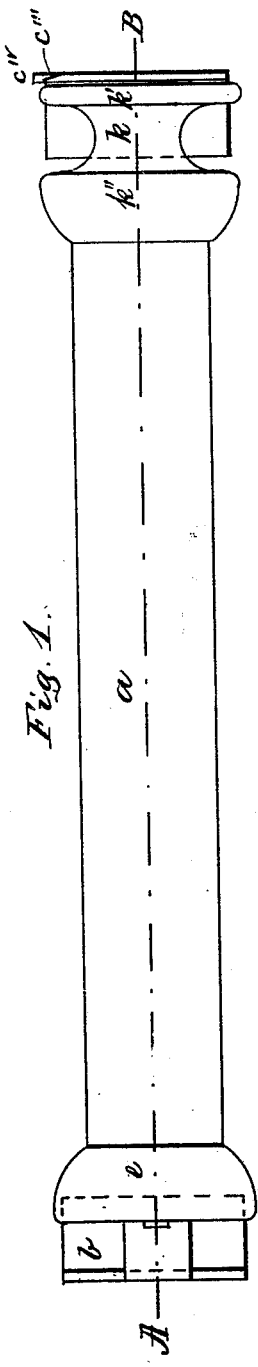
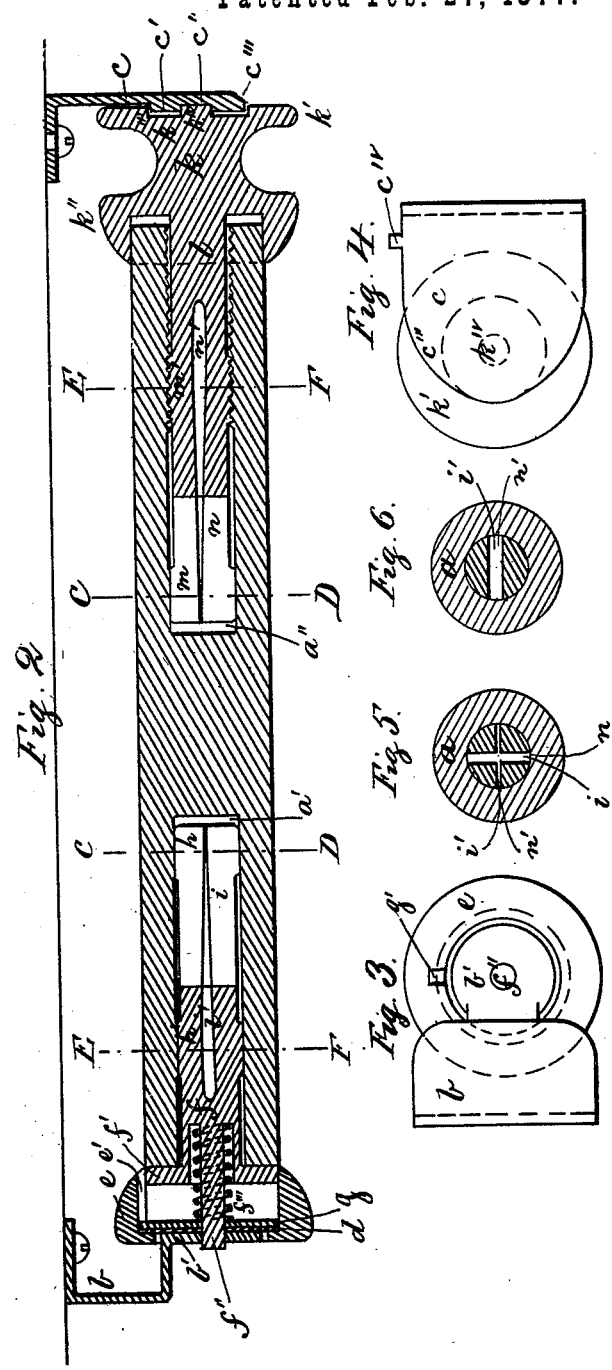
Witnesses:
F. Allen.
Geo. W. Fusgang
Inventor:
William C. Sharp.
by Alban Andrén
his atty.

UNITED STATES PATENT OFFICE.

WILLIAM C. SHARP, OF BOSTON, MASSACHUSETTS.

IMPROVEMENT IN CURTAIN-FIXTURES.

Specification forming part of Letters Patent No. 187,918, dated February 27, 1877; application filed September 2, 1876.

*To all whom it may concern:*

Be it known that I, WILLIAM C. SHARP, of Boston, in the county of Suffolk and State of Massachusetts, have invented certain new and useful Improvements in Curtain-Fixtures; and I do hereby declare that the following is a full, clear, and exact description thereof, which will enable others skilled in the art to which it appertains to make and use the same, reference being had to the accompanying drawings, and to the letters of reference marked thereon, which form a part of this specification.

My invention relates to improvements in curtain-fixtures; and consists in an automatically-adjustable friction device, consisting of an annular hollow chamber in the end of the curtain-rod, in which is located friction-plates, that are pressed against the stationary bracket by means of a coiled spring surrounding the central pivot of the curtain-rod. The friction-plates above named are two in number, one metallic one, against which the end of the coiled spring is pressing, and which plate turns around with the curtain-rod, having for this purpose a projection on its circumference, that fits into a corresponding slot in the annular hollow chamber aforesaid. The second friction-plate is located between the first plate and the stationary bracket, and this latter friction-plate is made of suitable cloth or some textile or fibrous material, for the purpose of increasing the friction between the rotary curtain-rod and its stationary support or bracket.

The great advantage of this arrangement is that it is automatically adjustable, and the friction is constant, even if the support or bracket should happen to be located a little out of its true and central position, as the spiral spring aforesaid will, in any case, force the friction-plates squarely against the stationary bracket or support.

My invention also relates to an improved manner of attaching the shank of the annular chamber into the curtain-rod without the use of glue, or pins, or similar contrivances; and consists of a shank provided with a pair of annular enlargements, in combination with a pair of slits or cuts running at right angles to each other, and in the direction of the center-line of the shank. One of these slits is made from the end of the shank to a place between the first and second annular enlargements; but the second slit is carried farther, and beyond the second annular enlargement of the shank, by which the shank is rendered yielding and elastic, so that it can be pushed into a cylindrical chamber in the end of the curtain-rod, and retained in its desired position by the friction between the yielding annular enlargements and the inside of the cylindrical chamber in the curtain-rod.

My invention also relates to an improved device for increasing or decreasing the length of the curtain-rod, and thereby, also, regulating the friction of the rod in its bearings, so as to sustain the curtain in any desired position; and this part of my invention consists of a shank made in one piece with the curtain-roller, or attached firmly to the same. This shank is provided with a pair of slits made in right angles to each other, and provided with annular enlargements similar to the one described heretofore in the opposite end of the rod; with this difference, however, that one of the annular enlargements is provided with an external screw-thread fitting into an internal screw-thread in a cylindrical chamber in the center of the rod. Besides this, I provide that part of the roller nearest to the curtain-rod with an annular flange or cap that surrounds the end of the rod, so that the screw-threaded shank can be screwed in and out, to adjust the length of the rod and the amount of the friction without exposing the extreme end of the curtain-rod.

And, finally, my invention relates to improvements for the purpose of preventing the curtain-cord from getting entangled around the bearing nearest to the roller, and from running off the roller by carelessly pulling down the curtain, as often is the case with the ordinary curtain-fixtures; and this my device consists in providing the inside of the bearing nearest to the roller with an annular projection that fits into a similar recess in the end of the roller, the center of which is provided with a pivot running in a bearing made in the annular projection on the fixture or bracket. The outer edge of the latter is made tapering from the roller outward, and made as a shield covering the greater portion of the rear of the roller, and, furthermore, provided with a stop or projection on the upper part of the shield, so as to stop the end from getting behind the roller in case it should slip over the flange of the latter.

On the accompanying drawings, Figure 1 represents a front elevation of my invention. Fig. 2 represents a central longitudinal section on the line A B shown in Fig. 1. Fig. 3 represents an end view seen from A in Fig. 1. Fig. 4 represents an end view seen from B in Fig. 1. Fig. 5 represents a cross-section on the lines C D, and Fig. 6 represents a cross-section on the lines E F shown in Fig. 2.

Similar letters refer to similar parts wherever they occur on the different parts of the drawings.

$a$ represents the curtain-roller, and $b\ c$ represents the bearings or fixtures, that are secured to the wall or frame of a window. The bearing $b$ is made as a circular washer, $b'$, that rests against a textile or fibrous washer, $d$, inclosed in the cap or chamber $e$, that is secured by glue or otherwise to the flange $f'$ of the shank $f$. The central part of the shank $f$ is made as a pivot, $f''$, around which is located the spiral spring $f'''$, resting in one end in a recess made in the shank $f$, and in the outer end against a metallic washer, $g$, that is provided with a projection, $g'$, fitting into a slot, $e'$, in the cap $e$, so as to prevent said washer from turning around in the cap $e$.

It will thus be seen that the washer $d$ is pressed against the circular bearing $b'$ by means of the spring $f'''$ pressing against the metallic washer $g$, and in this manner I obtain the desired friction at the bearing $b\ b'$, even if the latter should be fixed out of true, as often is the case where inexperienced people put up curtain-fixtures.

The central pivot $f''$ projects loosely through a perforation made in the bearing-plate $b'$, as shown. The shank $f$ projects into a cylindrical recess, $a'$, in the rod $a$, and is provided with annular enlargements, $h\ h'$, in combination with central slits $i\ i'$, made at right angles to each other, as shown in Fig. 5. The slit $i$ terminates between the enlargements $h$ and $h'$; but the slit $i$ projects beyond the enlargement $h'$, and is made wider as it approaches the latter, as shown in Fig. 2, by which the shank $f$ is made so yielding and elastic that it can be compressed and inserted in the hollow $a'$ in the rod $a$, where it will expand and be held firmly in its proper place without the need of glue or other fastening devices.

$k$ represents the roller, with its outer flange $k'$ and annular cap or protector $k''$, that fits around the end of the curtain-rod $a$, as shown. $l$ represents the shank, that is made in one piece with the roller $k$ and is made with annular enlargements $m\ m'$, and slits $n\ n'$, fitting in a cylindrical recess, $a''$, in the rod $a$, similar to the arrangements described relative to the shank $f$, its enlargements $h\ h'$, and slits $i\ i'$, with this difference, that the enlargement $m'$ is provided with an external screw-thread, as shown, fitting into a female screw-thread in the recess $a''$, by which I am able to turn the roller $k$ around its axis in either direction, and in this manner increase or decrease the length of the rod between its bearings, so as to obtain a greater or less amount of friction on the roller without the need of changing the position of the fixtures or bearings.

The flange $k'$ of the roller $k$ is provided with an annular recess, $k'''$, and a central pivot, $k^{iv}$, the latter having its bearings in the central recess $c''$, made on the inside of the bearing $c$, as shown in Fig. 2, by which arrangement the pivot $k^{iv}$ is protected, so that the cord will not be liable to wind around it, as is commonly the case with ordinary curtain-fixtures. Furthermore, the bearing $c$ is made in the form of a shield, as shown in Fig. 4, that covers nearly the whole of the rear part of the flange $k'$, which shield is made tapering in its outer and upper edges, as shown at $c'''\ c'''$, in Figs. 1 and 2, by which the cord will be conducted outside of the shield $c$, if it runs off the roller $k$, and the cord is, furthermore, prevented from getting too far beyond the roller, by means of the stop or projection $c^{iv}$ on the upper side of the bearing or shield $c$.

The said projection $c^{iv}$ is very useful in case the cord should, by careless handling, slip out of the pulley, when the said projection will serve as a stop, by which the cord is prevented from slipping over and beyond the flange of the cord-pulley. In case the cord escapes the pulley it will run on the shield or protector $c$ till it reaches the projection $c^{iv}$, when it will automatically be conducted properly into the roller $k$, without any liability of being entangled on the pivot or its bearing.

Having thus fully described the nature, construction, and operation of my invention, I wish to secure by Letters Patent and claim—

1. In combination, the roller $a$, bearing $b\ b'$, cap $e$, washers $d\ g$, pivot $f''$, and spiral spring $f'''$, as and for the purpose set forth and described.

2. In combination, the roller $a$, shank $f$, with its pivot $f''$, annular enlargements $h\ h'$, slits $i\ i'$, and the cylindrical recess $a'$, as and for the purpose set forth and described.

3. In combination, the roller $a''$, the roller $k$, with its cap $k''$, shank $l$, with its annular enlargement $m$, and screw-threaded enlargement $m'$ fitting in the female screw-thread of the recess $a''$, and provided with the slits $n\ n'$, as and for the purpose set forth and described.

4. In combination, the roller $k$, with its flange $k'$, recess $k'''$, and pivot $k^{iv}$, and the shield-bearing $c$, with its annular projection $c'$, central recess $c''$, tapering edge $c'''$, and stop or projection $c^{iv}$, as and for the purpose set forth and described.

In testimony that I claim the foregoing as my own invention I have affixed my signature in presence of two witnesses.

WILLIAM C. SHARP.

Witnesses:
 HENRY CHADBOURN,
 ALBAN ANDRÉN.